United States Patent Office 2,850,493
Patented Sept. 2, 1958

2,850,493
OIL SOLUBLE AZO COLORS

Joseph Seruto, Temple City, Calif., assignor to American Cyanamid Company, New York, N. Y., a corporation of Maine No Drawing. Application November 10, 1953
Serial No. 391,389

8 Claims. (Cl. 260—182)

This invention relates to new azo dyes, and more particularly to new azo dyes which are highly useful as oil-soluble colors.

Oil-soluble coloring matters are in wide use in coloring plastics, lacquers, gasoline and in making colored smokes. In order to obtain strong colors, especially for use in plastics and lacquers, the coloring matters require good solubility in the organic vehicle used in the plastics and lacquers. It is also important that the coloring matters have good lightfastness, since in both of these uses they are exposed to the action of sunlight. In the case of colored smokes, it is also important that the coloring matters be sufficiently volatile so as to sublime and form a dense colored smoke.

It is especially difficult to produce oil-soluble colors of deep shades having these desirable properties. For example, shades varying from blue-reds to violets are especially difficult to obtain. Azo dyes, in general, are not very soluble in hydrocarbons and other organic solvents. This is particularly true of the polyazo compounds, and it is difficult to obtain colors with these deep shades which also possess the proper oil solubility.

According to the present invention, it has been found that it is possible to prepare new azo coloring matters of deep shades of blue-reds and violets as well as yellows and oranges which surprisingly possess high solubility in hydrocarbons and other organic solvents, and as such are highly useful as coloring matters for coloring plastics, lacquers, gasoline, smokes, etc.

The new azo dyes of this invention are prepared by coupling diazotized carbocyclic aryl amines having less than three rings, and which are free of hydroxyl or other hydrophilic groups, with beta-naphthols substituted by at least one alkyl group containing more than three carbon atoms. The resulting coloring matters possess excellent solubility in hydrocarbons and other organic solvents. It is surprising that the addition of an alkyl group to such a large molecule, especially when the dye is a polyazo dye, changes the solubility of the dye to such a considerable extent.

Suitable carbocyclic aryl amines are the amines of the benzene series, such as aniline, the toluidines, the xylidines, anisidine, the chloro and nitro derivatives of aniline and toluidine such as chloroaniline, nitroaniline, chlorotoluidine, nitrotoluidine, and the like; amino compounds of the naphthalene series such as alpha-naphthylamine and its derivatives; and in an especially preferred embodiment, the diaminodiphenylamines such as benzidine, tolidine, and dianisidine. As pointed out above, it is essential that the amine be free of hydrophilic groups, such as sulfonic groups, carboxylic groups, or hydroxy groups, as these tend to decrease the oil solubility.

The coupling of the described diazotized carbocyclic aryl amines with the beta-naphthols is effected in the usual manner.

The alkyl naphthols used as coupling components include alkyl derivatives of beta-naphthol which contain alkyl groups having more than three carbon atoms, such as butyl, isobutyl, amyl, isoamyl, hexyl and octyl groups. Polyalkyl derivatives of beta-naphthol, such as diamyl-2-naphthol are also useful. These naphthols can be prepared by various processes known to the art and can be used in varying stages of purity. However, the use of crude reaction products from the alkylation of beta-naphthol may lead to minor shade differences and reduction in fastness to light because of the presence of isomeric products.

The invention will be described in greater detail in conjunction with the following specific examples in which the parts are by weight unless otherwise specified.

Example 1

6.1 parts of dianisidine is slurried in 12.5 parts of concentrated hydrochloric acid. 25 parts of water is added followed by 36 parts of ice. 12 parts by volume of 5 N sodium nitrite solution is then added and the mixture is stirred until tetrazotization is complete. The solution is clarified by filtration and the excess nitrous acid is destroyed with sulfamic acid. A solution of 12.5 parts of amyl beta-naphthol in 50 parts of water and 30 parts by volume 5 N sodium hydroxide is prepared. The solution of the tetrazotized dianisidine is added slowly with stirring and the mixture is stirred until coupling is complete. The product is isolated by filtration and is washed with water. The dried product is a violet powder showing considerable solubility in organic solvents such as benzene, toluene, hexene, and the like and is highly useful in coloring lacquers, gasolines, plastics, etc.

Example 2

The procedure of Example 1 is followed except that 4.6 parts of benzidine is used in place of the dianisidine. The product is a blue-red powder possessing considerable solubility in organic solvents.

Example 3

The procedure of Example 1 is followed replacing the dianisidine with 5.3 parts tolidine. The product is a reddish powder which dissolves readily in organic solvents to give a bluish red solution.

Examples 4–8

The procedure of Example 1 is followed substituting equivalent amounts of the amines listed below, and the following dyes are obtained.

| Diazo component | Coupling component | Color |
| --- | --- | --- |
| Alpha naphthylamine | Amyl beta naphthol | Red. |
| Para-aminodiphenylamine | do | Deep red. |
| Para-toluidine | do | Orange red. |
| Ortho-toluidine | do | Do. |
| Dianisidine | Diamyl beta naphthol | Red violet. |

Example 9

The procedure of Example 1 is followed except that isobutyl beta-naphthol is substituted for the amyl beta-naphthol used therein. A similar dye is produced. Similarly, octyl beta-naphthol can be substituted for the amyl beta-naphthol in the foregoing examples.

I claim:

1. The dyes prepared by coupling diazotized carbocyclic aromatic amines having less than three rings and being free of hydrophilic groups with at least about an equal molar quantity of an alkyl beta-naphthol having the alpha position next to the hydroxyl free and in which the alkyl group has from four to eight carbon atoms and which is free from other substituents other than alkyl groups of from four to eight carbon atoms.

2. The dyes prepared by coupling diazotized carbocyclic aromatic amines selected from the group consisting of aniline, toluidine, xylidine, anisidine, chloroaniline, nitroaniline, chlorotoluidine, nitrotoluidine, alpha-naphthylamine, benzidine, tolidine and dianisidine with at least about an equal molar quantity of an alkyl beta-naphthol having the alpha position next to the hydroxyl free selected from the group consisting of amyl beta-naphthol, diamyl beta-naphthol, isobutyl beta-naphthol, octyl beta-napthol, butyl beta-naphthol, isoamyl beta-naphthol, and hexyl beta-naphthol.

3. The products according to claim 2 in which the alkyl beta-naphthol is amyl beta-naphthol.

4. The dye formed by coupling diazotized alpha naphthylamine with at least about an equal molar quantity of amyl beta-naphthol.

5. The dye formed by coupling tetrazotized dianisidine with at least about an equi-molar quantity of amyl beta-naphthol.

6. The dye formed by coupling tetrazotized benzidine with at least about an equi-molar quantity of amyl beta-naphthol.

7. The dye formed by coupling tetrazotized tolidine with at least about an equi-molar quantity of amyl beta-naphthtol.

8. The dye formed by coupling diazotized para-toluidine with at least about an equi-molar quantity of amyl beta-naphthol.

References Cited in the file of this patent

UNITED STATES PATENTS

| | | |
|---|---|---|
| 525,492 | Duisberg | Sept. 4, 1894 |
| 1,462,613 | Murray | July 24, 1923 |
| 2,060,965 | Wilson | Nov. 17, 1936 |
| 2,068,081 | Sharma | Jan. 19, 1937 |
| 2,224,904 | Elley et al. | Dec. 17, 1940 |
| 2,480,006 | Felix et al. | Aug. 23, 1949 |

FOREIGN PATENTS

| | | |
|---|---|---|
| 688,000 | Great Britain | Feb. 25, 1953 |

UNITED STATES PATENT OFFICE
CERTIFICATE OF CORRECTION

Patent No. 2,850,493                          September 2, 1958

Joseph Seruto

It is hereby certified that error appears in the printed specification of the above numbered patent requiring correction and that the said Letters Patent should read as corrected below.

Column 3, line 10, for the claim reference numeral "2" read -- 1 --.

Signed and sealed this 9th day of December 1958.

(SEAL)
Attest:

KARL H. AXLINE
Attesting Officer

ROBERT C. WATSON
Commissioner of Patents